US012625734B2

(12) United States Patent
Dong et al.

(10) Patent No.: US 12,625,734 B2
(45) Date of Patent: May 12, 2026

(54) HIGH AVAILABILITY SCHEDULER EVENT TRACKING

(71) Applicant: International Business Machines Corporation, Armonk, NY (US)

(72) Inventors: Xin Xin Dong, Beijing (CN); Ming Qiao Shang Guan, Beijing (CN); Mai Zeng, Beijing (CN); Wei Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 17/568,804

(22) Filed: Jan. 5, 2022

(65) Prior Publication Data

US 2023/0214265 A1 Jul. 6, 2023

(51) Int. Cl.
*G06F 9/50* (2006.01)
*G06F 9/54* (2006.01)

(52) U.S. Cl.
CPC .......... *G06F 9/5038* (2013.01); *G06F 9/5016* (2013.01); *G06F 9/5044* (2013.01); *G06F 2209/508* (2013.01)

(58) Field of Classification Search
CPC .... G06F 9/5038; G06F 9/5016; G06F 9/5044; G06F 2209/508
See application file for complete search history.

(56) References Cited

U.S. PATENT DOCUMENTS

| | | | | |
|---|---|---|---|---|
| 6,108,689 A | * | 8/2000 | Fagen | G06F 9/544 |
| | | | | 709/206 |
| 10,140,068 B1 | * | 11/2018 | Holdman | G06F 3/0686 |
| 10,452,531 B1 | * | 10/2019 | Jung | G06F 12/0238 |

(Continued)

FOREIGN PATENT DOCUMENTS

| | | | | |
|---|---|---|---|---|
| JP | 2000-347884 A | | 12/2000 | |
| JP | 2007-094821 A | | 4/2007 | |
| WO | WO-2010008984 A2 | * | 1/2010 | G06F 12/0868 |

OTHER PUBLICATIONS

"Configuring Sysplex for high availability", Published Date: Sep. 9, 2021, 3 pages.

(Continued)

*Primary Examiner* — Aimee Li
*Assistant Examiner* — Andrew NMN Sun
(74) *Attorney, Agent, or Firm* — CANTOR COLBURN LLP; Stephen Yoder

(57) ABSTRACT

Aspects include monitoring, by a controller, an operational status of a tracker system that is configured to track and record a current status of a job being executed and to report completion of the job to the controller. The recording includes storing two copies of the current status, where a first copy is stored in a shared memory location accessible by the controller. In response to determining, based on the monitoring, that the tracker system is operational, waiting to receive a job completion message for the job from the tracker system and performing a job completion action based on receiving the job completion message. In response to determining that the tracker system is not operational, obtaining the current status of the job from the shared memory location and performing the job completion action based on the current status indicating that the job has completed.

14 Claims, 8 Drawing Sheets

(56) References Cited

U.S. PATENT DOCUMENTS

| | | | | |
|---|---|---|---|---|
| 2010/0169895 A1* | 7/2010 | Dice | .................. | G06F 12/0815 |
| | | | | 719/312 |
| 2010/0287565 A1* | 11/2010 | Edmeades | .............. | G06F 9/546 |
| | | | | 719/314 |
| 2013/0185586 A1 | 7/2013 | Vachharajani et al. | | |
| 2013/0332507 A1* | 12/2013 | Du | ........................ | H04L 47/125 |
| | | | | 709/203 |
| 2014/0092806 A1* | 4/2014 | Kidron | .................... | G06F 13/12 |
| | | | | 370/328 |
| 2014/0130054 A1* | 5/2014 | Molkov | ................ | G06F 9/5072 |
| | | | | 718/104 |
| 2014/0325256 A1* | 10/2014 | Lambert | ............. | G06F 11/2094 |
| | | | | 714/4.11 |
| 2015/0100547 A1* | 4/2015 | Holmes-Higgin | ........................... | |
| | | | | H04L 67/1095 |
| | | | | 707/610 |
| 2017/0242673 A1* | 8/2017 | Catalano | ................. | G06F 11/00 |
| 2018/0095855 A1* | 4/2018 | Sanakkayala | ....... | G06F 11/3006 |
| 2020/0045108 A1 | 2/2020 | Elko et al. | | |
| 2022/0188147 A1* | 6/2022 | Nudelman | .............. | G06F 9/485 |

OTHER PUBLICATIONS

David Raften et al., "Parallel Sysplex Availability Checklist", Published Date: Jun. 2020, 69 pages.

IBM, "Achieving the Highest Levels of Parallel Sysplex Availability", Published Date: Dec. 2004, 294 pages.

IBM, "High Availability for SAP on zSeries Using Autonomic Computing Technologies", Published Date: Aug. 2004, 356 pages.

Robert Vaupel, "High Availability and Scalability of Mainframe Environments using System z and z/OS as example", Published Date: Jan. 2013, 346 pages.

Peter Mell et al., "The NIST Definition of Cloud Computing", NIST, Special Publication 800-145, Sep. 2011, 7 pages.

Japan Patent Office, "Notice of Reasons for Refusal" Feb. 17, 2026, 04 Pages, JP Application No. 2022-204349.

* cited by examiner

HIGH AVAILABILITY SCHEDULER EVENT TRACKING

BACKGROUND

The present invention relates generally to computer processing, and more specifically, to high availability scheduler event tracking.

IBM® Z® Workload Scheduler is an example of a workload automation solution that enables organizations to automate, plan, and control the processing of complex systems' workloads. It allows workflows to be managed from a single point of control across multiple platforms and business applications.

The controller is the focal point of the IBM Z Workload Scheduler configuration. It contains the controlling functions, Interactive System Productivity Facility (ISPF) dialogs, databases, and plans. The system that the controller is started on is referred to as the IBM Z Workload Scheduler controlling system. IBM Z Workload Scheduler systems that communicate with the controlling system are called controlled or tracker systems. The controller provides a single, consistent, control point for submitting and tracking the workload on any operating environment. IBM Z Workload Scheduler provides distributed agents and open interfaces that can be used to integrate the planning, scheduling, and control of work units such as online transactions, file transfers, or batch processing in any operating environment that can communicate with z/OS®.

An execution tracker (or "tracker") is required for every z/OS system in an IBM Z Workload Scheduler configuration. The tracker handles the submission of jobs and tasks on the system, and keeps track of the status of the workload. In conjunction with standard interfaces to a Job Entry Subsystem (JES) and System Management Facilities (SMF), IBM Z Workload Scheduler records the relevant information about the workload by generating event records. The event records are captured and stored by the tracker. The tracker then communicates event information to the controller for further processing. The log where events are written by the tracker is called the event data set. The IBM Z Workload Scheduler address spaces are defined as z/OS subsystems. The routines that run during subsystem initialization establish services that enable event information to be generated and stored in an extended common service area (ECSA).

In an IBM Z Workload Scheduler, the tracker handles the submission of jobs on the system, keeps track of the status of the workload, and sends the event records to the controller. The events are stored in an ECSA queue, then copied into the events dataset, and finally sent to the controller. When a failure of the tracker occurs, if there were events in the ECSA queue not yet copied to the event dataset, they will be unavailable until the tracker becomes operational again. For a job(s) that has already completed on the target system, a delay in processing can occur because the scheduler may be blocked from continuing execution of subsequent jobs until the controller gets the results indicating that the job has completed.

SUMMARY

Embodiments of the present invention are directed to methods for high availability scheduler event tracking. A non-limiting example method includes monitoring, by a controller, an operational status of a tracker system that is configured to track and record a current status of a job being executed and to report completion of the job to the controller. The recording includes storing two copies of the current status, including a first copy that is stored in a shared memory location accessible by the controller. In response to determining, based on the monitoring, that the tracker system is operational, the controller waits to receive a job completion message for the job from the tracker system and performs a job completion action based on receiving the job completion message. In response to determining that the tracker system is not operational, the controller obtains the current status of the job from the shared memory location and performs the job completion action based on the current status indicating that the job has completed.

This can provide an improvement over known methods of tracking by alleviating the delay in processing that can occur in contemporary systems when a tracker system becomes unavailable. By quickly identifying jobs that have completed even when the tracker is not operational, one or more embodiments of the present invention allow the controller or scheduler to continue with the execution of other jobs or other actions that depend on the job being completed. This can lead to improved response times and faster processing.

In addition to one or more of the features described above or below, or as an alternative, in further embodiments of the prevent invention a second copy of the current status is stored in an extended common service area (ECSA) that is not accessible by the controller system. One or more embodiments advantageously provide local access to the current status to the tracking module.

In addition to one or more of the features described above or below, or as an alternative, in further embodiments of the prevent invention current status records corresponding to the job are removed from the shared memory location upon completion of the job. One or more embodiments advantageously provide efficient utilization of shared memory storage.

In addition to one or more of the features described above or below, or as an alternative, in further embodiments of the prevent invention the shared memory location is provided by a coupling facility (CF).

In addition to one or more of the features described above or below, or as an alternative, in further embodiments of the prevent invention it is determined that the tracker system is not operational in response to the controller not being able to communicate with the tracker system. One or more embodiments advantageously provide expedited processing of a stream of jobs.

In addition to one or more of the features described above or below, or as an alternative, in further embodiments of the prevent invention the job completion action comprises initiating execution of a second job. One or more embodiments advantageously provide expedited processing of a stream of jobs.

In addition to one or more of the features described above or below, or as an alternative, in further embodiments of the prevent invention the current status of the job is obtained from one or both of a system management facilities (SMF) record and a job entry system (JES) record.

Other embodiments of the present invention implement features of the above-described methods in systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention are directed to providing high availability scheduler event tracking for a scheduler configuration, such as an IBM® Z® Workload Scheduler configuration, when an execution tracker failure occurs. One or more embodiments of the prevent invention use a coupling facility (CF) component that provides sharing of data across a system complex (sysplex) to store job event records that are duplicates of the job event records that are stored in an extended common service area (ECSA) queue of the tracker system (also referred to herein as a "tracker" or "execution tracker"). The operational status of the tracker is monitored by a tracker monitor module executed by the controller which informs an event cross reader module to handle the process once the tracker becomes unavailable due, for example, to a failure that causes the tracker to abend. In accordance with one or more embodiments of the present invention, the event cross reader module reads job event record(s) in the CF to determine the status of the jobs previously being tracked by the tracker, collects job execution results from job outputs, and writes the record of the job event into the tracker's event dataset. Upon notification to the controller (e.g., via contents of the event dataset) that the job has completed, the scheduler can continue with executing jobs that depend on the completed job. The job completion can that the job completed successfully, that the job was canceled, or that the job ended in error. When the execution tracker becomes available to the sysplex again, it synchronizes records in the event dataset, ECSA, and CF structure, and continues execution.

By providing a method that monitors the tracker status and that switches over to an alternative manner of obtaining job completion status when the tracker is not operational, one or more embodiments of the present invention can alleviate the delay in processing that can occur in contemporary systems. By quickly identifying jobs that have completed even when the tracker is not operational, one or more embodiments of the present invention allow the controller or scheduler to continue with the execution of other jobs or other actions that depend on the job being completed.

Figure 1:
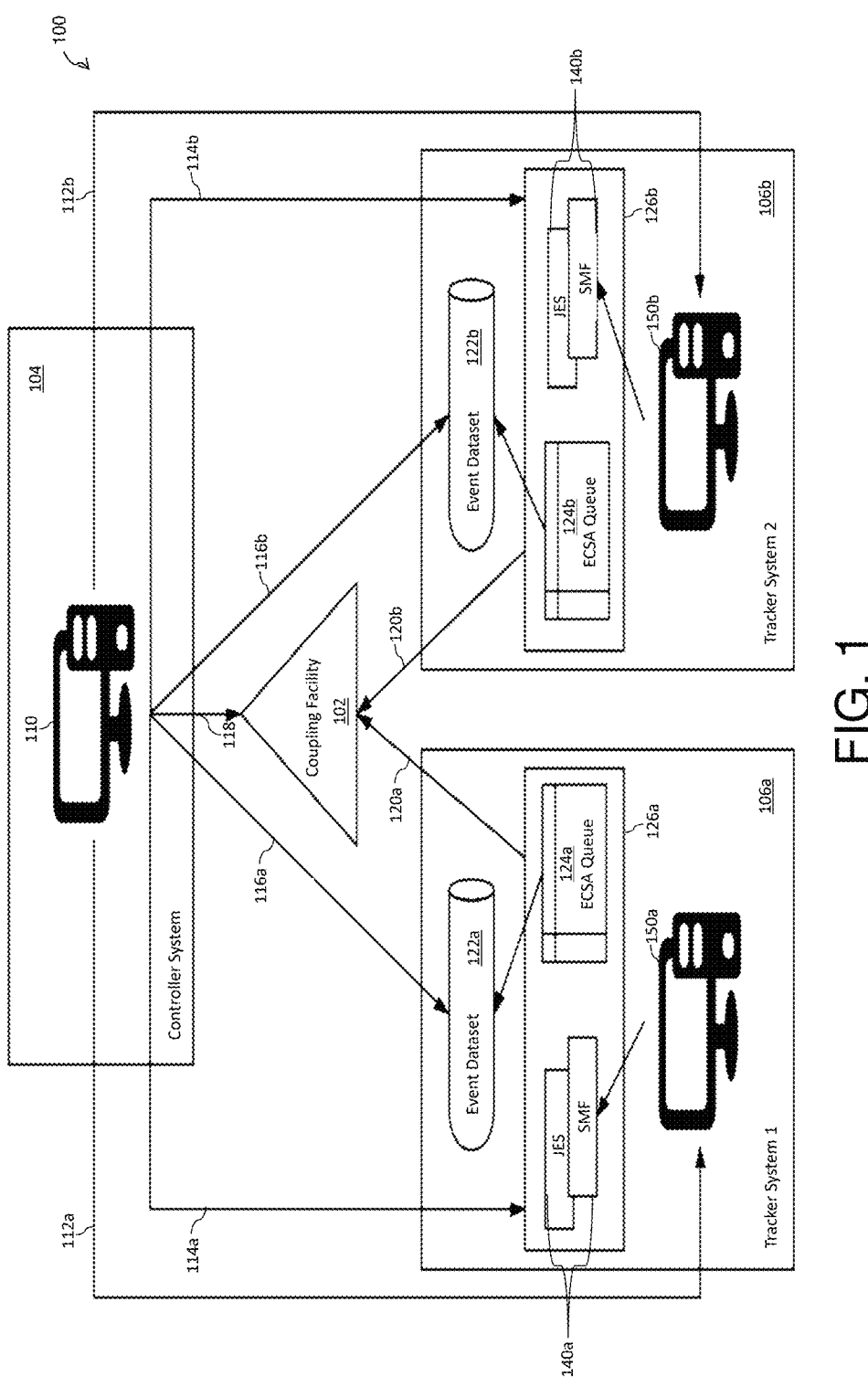
FIG. 1 depicts a block diagram of an operating environment for providing high availability event scheduler tracking according to one or more embodiments of the present invention.

Turning now to FIG. 1, a block diagram of an operating environment 100 for providing high availability scheduler tracking is generally shown in accordance with one or more embodiments of the present invention. All or a portion of the operating environment 100 shown in FIG. 1 can be implemented, for example, by computer system 800 of FIG. 8 and/or by one or more of the cloud computing nodes 10 and/or cloud computing devices 54A-N of FIG. 6. The operating environment 100 shown in FIG. 1 includes a coupling facility (CF) 102, a controller system 104, and two tracker systems 106a 106b (referred to collectively herein as "tracker system(s) 106").

IBM Z Workload Scheduler can be used to implement portions of the operating environment 100 shown in FIG. 1. As described previously, the controller system 104 is the focal point of the IBM Z Workload Scheduler configuration and it provides a single, consistent, control point for submitting and tracking a workload that is being executed. The controller system 104 shown in FIG. 1 includes a processor 110 that includes computer instructions for performing the processing described herein to implement the controller such as, but not limited to a tracker monitor and an event cross reader.

In accordance with one or more embodiments of the present invention, each system in an IBM Z Workload Scheduler configuration, such as operating environment 100 of FIG. 1, includes a tracker module, implemented by tracker system 106, that handles the submission of jobs and tasks on the system and keeps track of the status of the workload. As shown in the operating environment 100 of FIG. 1, each of the tracker systems 106 is in communication with the CF 102 and the controller system 104. Each tracker system 106 includes an event dataset 122a 122b (referred to collectively herein as "event datasets 122"), an intermediate data storage location 126a 126b (referred to collectively herein as "storage locations 126"), and a processor 150a 150b (referred to collectively herein as "processors 150") for executing all or a portion of the tracker module. Each of the intermediate data storge locations 126 includes an (ECSA) queue 124a 124b (referred to collectively herein as "ECSA queues 124"). Each of the intermediate data storage locations 160 also includes job entry system (JES) and/or system management facilities (SMF) records 140a 140b (referred to collectively herein as "JES and SMF records 140") obtained from the system(s) executing the workload being tracked by the tracker system 106.

In conjunction with standard interfaces to JES and SMF, the tracker system 106 records the relevant information about the workload being tracked by generating event records that are captured and stored by the tracker in an event dataset 122. The IBM Z Workload Scheduler address spaces can be defined as z/OS® subsystems, and routines that run during subsystem initialization establish services that enable event information to be generated and stored in an ECSA queue 124 even when an address space is not active.

The tracker systems 106 handle the submission of jobs on the system, keep track of the status of the workload, and send the event records to the controller system 104. The events, generated by exits (e.g., indicated by the JES and SMF records 140), are stored in the ECSA queue 124, and then copied into the event dataset 122, and finally sent to the controller system 104. In accordance with one or more embodiments of the present invention, coupling facility (CF) 102 is implemented by hardware and it allows multiple processors to access the same data.

As shown in FIG. 1. CF 102 is coupled to the controller system 104 and the tracker systems 106. One or more embodiments of the present invention can utilize one or more CFs 102 and the CFs 102 can utilize CF list structures to store the shared data. Using the CF allows data sharing across and within clusters, while maintaining the integrity, consistency, and availability of shared data.

As shown in the operating environment 100 of FIG. 1, in accordance with one or more embodiments of the present invention, each of the tracker systems 106 write job status records, or event record data, contained in the ECSA queue 124 to the CF 102. This connection, or writing of job status records to the CF 102, is indicated in FIG. 1 by arrows 120a 120b. Also, as shown by arrows 112a 112b in FIG. 1, the processor 110 in the controller system 104 (e.g., executing a tracker monitor module) monitors the status of the processors 150 in the tracker systems 106. In addition, as shown by arrow 118, when a tracker system 106 is not operational, a cross reader module executed by the processor 110 in the controller system 104 can access the CF 102 to read the job information. The controller system 104 can then monitor the job, as shown by arrows 114a 114b of FIG. 1, to determine job completion. Once the job completes, the controller system 104 writes a record to the event dataset 122 of the tracker system 106, as indicated by arrows 116a 116b to mark the job as completed. The job completion can indicate (e.g., via a job completion code or a status) that the job completed successfully, that the job was canceled, or that the job ended in error.

Figure 2:
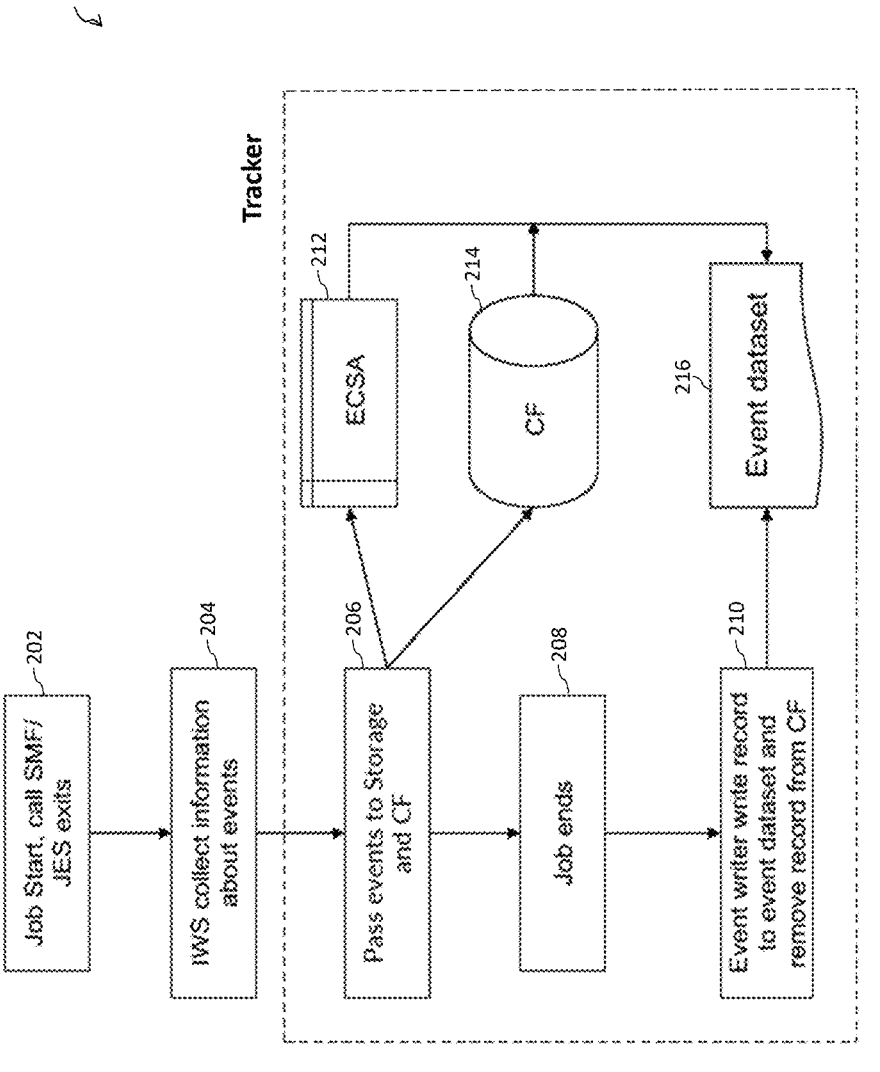
FIG. 2 depicts block diagram of a tracker according to one or more embodiments of the present invention.

Turning now to FIG. 2, a block diagram 200 of a tracker is generally shown in accordance with one or more embodiments of the present invention. All or a portion of the processing described in reference to the block diagram of FIG. 2 can be performed, for example, by computer system 800 of FIG. 8 and/or by one or more of the cloud computing nodes 10 and/or cloud computing devices 54A-N of FIG. 6. All or a portion of blocks 206, 208, 210, and 216 can be performed by computer instructions executing on a processor 150 of a tracker system 106 of FIG. 1.

At block 202, a job is started, and a call is made to SMF and JES interfaces to collect exit records related to the job being started. At block 204, information about events relating to the job is collected. As known in the art, information about an event includes, but is not limited to: job start date and time, job name, job identifier (ID), job end date and time, and job completion code. In one or more embodiments where IBM Z Workload Scheduler is utilized, the IBM Z Workload Scheduler collects the information and passes it to the tracker. As shown in FIG. 2, at block 206, the tracker receives the information about the events and builds a job status record that includes the information about the events to store in ECSA queue 212 and CF 214. The processing at blocks 204 and 206 can be repeated while the job is executing.

Still referring to FIG. 2, processing continues at block 208 with the job ending. In accordance with one or more embodiments of the present invention, the tracker is notified that the job has ended when it receives information that includes a job end date and time. At block 210, an event writer portion of the tracker writes the job record to the event dataset 216 and removes the previously written event records related to the job from the CF 214. In accordance with one or more embodiments of the present invention, the job record includes: job start date and time, job name, job ID, job end date and time, and job completion code.

In accordance with one or more embodiments of the present invention, when the execution tracker becomes available after not being operational for a period of time it resynchronizes events between the ECSA queue 212, the CF 214, and the event dataset 216.

As described previously, in accordance with one or more embodiments of the present invention, a tracker monitor, or tracker monitor module, is executed by the controller. The monitoring can include monitoring the controller-tracker connection via for example, but not limited to, TCP/IP, XCF, and/or NCF. When the connection between the controller and the execution tracker, or tracker system, is lost, the tracker monitor module initiates execution of the event cross reader module. In accordance with one or more embodiments of the present invention, the event cross reader module is executed by the controller (e.g., as subtask). When communication with the execution tracker is lost, the event cross reader module reads information from the CF to obtain the job information, and it calls programs to monitor the job status. When the event cross reader module receives a job status that indicates that the job has completed, it writes a record to the execution tracker's event dataset. In accordance with one or more embodiments of the present invention, when the tracker monitor module detects a connection between the execution tracker and the controller, the subtask executing the event reader module is ended and the tracker takes over the process of tracking the events. In accordance with one or more embodiments of the present invention, a separate event reader on the controller processes the events and the IBM Z Workload Scheduler takes the relevant actions that are defined in the applications being executed. The actions may include, but are not limited to, continue execution and interrupt execution.

In accordance with one or more embodiments of the present invention, job status, or event data, is not lost when the tracker is not operational as long as the CF structure is large enough to hold all the event records for jobs executing during the same times period in a sysplex and the event dataset is large enough to hold all event records for jobs that are completed during the same time period in a logical partition (LPAR).

Figure 3:
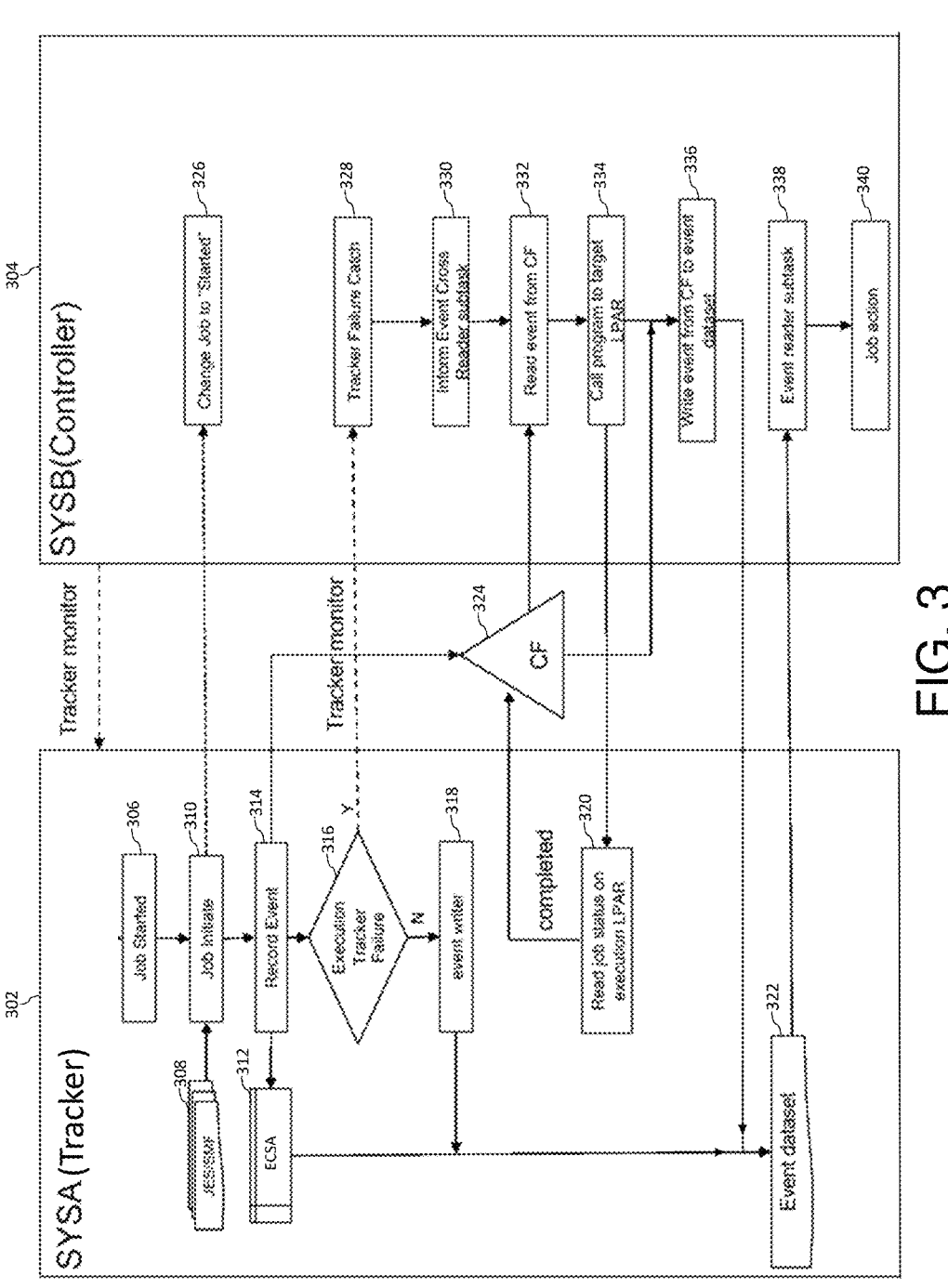
FIG. 3 depicts a block diagram of workflow performed by a tracker and a controller according to one or more embodiments of the present invention.

Turning now to FIG. 3, a block diagram 300 of workflow performed by a tracker 302, such as tracker system 106a of FIG. 1, and a controller 304, such as controller system 104 of FIG. 1, is generally shown in accordance with one or more embodiments of the present invention. All or a portion of the processing described in reference to the block diagram of FIG. 3 can be performed, for example, by computer system 800 of FIG. 8 and/or by one or more of the cloud computing nodes 10 and/or cloud computing devices 54A-N of FIG. 6. As shown in the embodiment of FIG. 3, the tracker 302 is executed on "SYSA" and the controller 304 is executed on "SYSB." Also shown in FIG. 3 is a "tracker monitor" that is executed by the controller 304. In accordance with one or more embodiments of the present invention, the tracker monitor continuously monitors the operational status of the tracker 302 via XCF, NCF, and/or TCP/IP.

A job is started by the tracker 302 at block 306 and at block 310, the job is initiated. In response to the job being initiated at block 310, processing continues at blocks 314 and 326. At block 314, the tracker 302 builds a job status record, or event record, with job information (e.g., from JES and/or SMF records 308) which it stores in ECSA queue 312 and CF 324. At block 326, the job status is changed from ready to started at the controller 304. At block 316, it is determined whether an execution tracker failure has occurred. This can be determined, for example, by the tracker not being able to communicate with the controller 304, or by the tracker 302 reporting a failure to the controller 304, or in any other manner.

If it is determined, at block 316, that a tracker failure has not occurred while the job is executing, then processing continues at block 318 with the event writer of the tracker 302 writing a job record to event dataset 322 upon job completion. The job record can include, but is not limited to job start date and time, job name, job ID, job end date and time, and job completion code (e.g., completed successfully, canceled, ended in error). In addition, previously written event records related to the job are removed from the CF 324. In accordance with one or more embodiments of the present invention, only jobs that are currently in process have event records in the CF 324.

If it is determined, at block 316 of FIG. 3, that a tracker failure has occurred, then the tracker monitor notifies the controller 304 at block 328 that a failure of the tracker has been detected. At block 330, the tracker monitor module informs, or initiates, the event cross reader subtask, or module, to take over the process. At block 332, the event cross reader module reads an event record for the job from the CF 324 and at block 334 it initiates a code on the tracker 302 that reads the status of the job. The job is then monitored for job completion. In accordance with one or more embodiments of the present invention, the event record includes the job name and job ID which is used at block 320 to obtain the job status from JES record(s) of the executing system (e.g., LPAR). The job status of completion can include that the job completed successfully, that the job was canceled, rot ha the job ended in error.

Once it is determined that the job has completed, the event cross reader module writes a record to the CF 324 to mark the job as complete, the record including a job completion code that indicates whether the job completed successfully, the job was canceled, or the job ended in error. Processing continues at block 336 with writing the job record indicating that the job is complete to the event dataset 322. At block 338, an event reader on the controller 304 receives a notification that job is complete and the controller 304 performs a job action at block 340. In accordance with one or more embodiments of the present invention, the job action can include, but is not limited to continuing execution and interrupting execution.

The process flow diagram of FIG. 3 is not intended to indicate that the operations are to be executed in any particular order, or that all of the operations shown in FIG. 3 are to be included in every case. Additionally, the processing shown in FIG. 3 can include any suitable number of additional operations.

In accordance with one or more embodiment of the present invention, there is one tracker on each logical partition (LPAR). The job can be submitted from one tracker located on a first LPAR, but it can be executed on a second LPAR (and not the submitting LPAR). The job status can be tracked by the first LPAR and the event writer on the second LPAR can write the event records on the ECSA queue. An example of this configuration is shown in FIG. 4.

Figure 4:
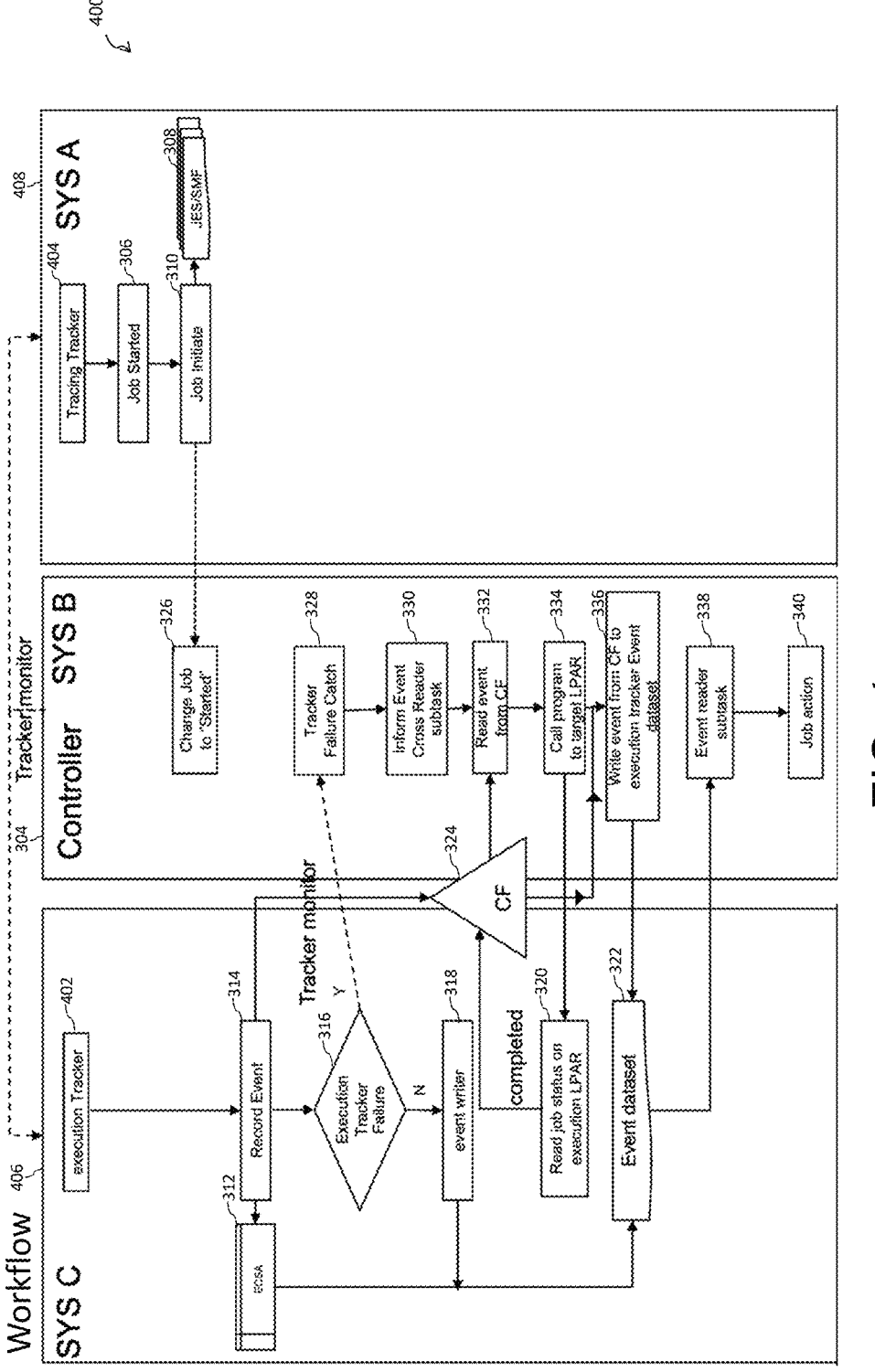
FIG. 4 depicts a block diagram of workflow performed by a plurality of trackers and a controller according to one or more embodiments of the present invention.

Turning now to FIG. 4, a block diagram 400 of workflow performed by tracker 406, tracker 408, and controller 304 is generally shown in accordance with one or more embodiments of the present invention. All or a portion of the processing described in reference to the block diagram of FIG. 4 can be performed, for example, by computer system 800 of FIG. 8 and/or by one or more of the cloud computing nodes 10 and/or cloud computing devices 54A-N of FIG. 6. As shown in the embodiment of FIG. 4, tracker 408 is executed on "SYS A", tracker 406 is executed on "SYS C", and controller 304 is executed on "SYS B." Also shown in FIG. 4 is a "tracker monitor", or tracker monitor module, which is executed by the controller 304 and in accordance with one or more embodiments of the present invention, continuously monitors the operational status of tracker 406 and tracker 408 via, for example, XCF, NCF, and/or TCP/IP.

As shown in FIG. 4, an execution tracker module 402 is executed by tracker 406 and a tracing tracker 404 is executed by tracker 408. At block 306 a job is started by the tracker 408 for execution on "SYS C" where tracker 406 is executing. At block 310, the job is initiated based at least is in part on JES and/or SMF records 308. In response to the job being initiated at block 310, processing continues at block 314 and 326. At block 314, the execution tracker module 402 being executed by tracker 406 builds a job status, or event, record with job information which it stores in ECSA queue 312 and CF 324. At block 326, the job status is changed from ready to started at the controller 416. At block 316, it is determined whether an execution tracker failure has occurred.

If it is determined at block 316 that a tracker failure has not occurred while the job is executing, then processing continues at block 318 with the event writer writing a job record to event dataset 322 upon job completion. The job record can include, but is not limited to job start date and time, job name, job ID, job end date and time, and job completion code. In addition, previously written event records related to the job are removed from the CF 324. In accordance with one or more embodiments of the present invention, only jobs that are in process have event records in the CF 324.

If it is determined at block 316 of FIG. 4 that a tracker failure has occurred, then the tracker monitor notifies the controller 304 at block 328 that a failure of the tracker has been detected. At block 330, the tracker monitor module informs, or initiates, the event cross reader subtask, or module, to take over the process. At block 332, the event cross module reads an event record for the job from the CF 324 and at block 334 it initiates a code on the tracker 406 that reads the status of the job. The job is then monitored for job completion.

Once it is determined that the job has completed, the event cross reader module writes a record to the CF 324 to mark the job as complete, the record including a job completion code that indicates whether the job completed successfully, the job was canceled, or the job ended in error. Processing continues at block 336 with writing the job record indicating that the job is complete to the event dataset 322. At block 338, an event reader on the controller 304 receives a notification that job is complete and the controller 304 performs a job action at block 340.

The embodiment shown in FIG. 4 allows for the continued tracking of job status when the execution tracker module 402 drops out of the sysplex (e.g., becomes non-operational or cannot be reached via a communication link). This continuous tracking can be performed without disrupting the execution schedule and event records, or job status records, will not be lost.

The process flow diagram of FIG. 4 is not intended to indicate that the operations are to be executed in any particular order, or that all of the operations shown in FIG. 4 are to be included in every case. Additionally, the processing shown in FIG. 4 can include any suitable number of additional operations.

Figure 5:
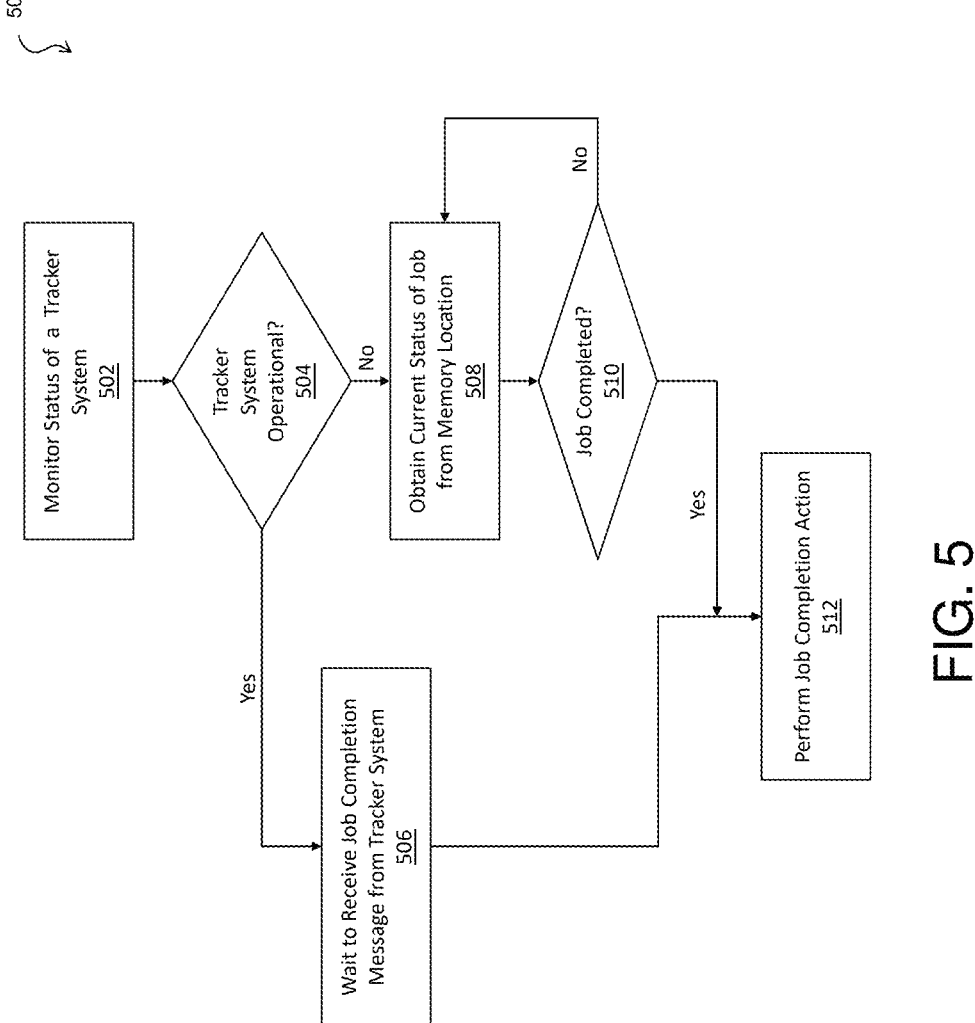
FIG. 5 depicts a flow diagram of a method for providing high availability scheduler event tracking according to one or more embodiments of the present invention.

Turning now to FIG. 5, a flow diagram of a method 500 for providing high availability scheduler tracking is generally shown in accordance with one or more embodiments of the present invention. All or a portion of the processing described in reference to the block diagram of FIG. 5 can be performed, for example, by controller system 104 of FIG. 1 or controller 304 of FIGS. 3 and 4.

At block 502, a controller monitors an operation status of a tracker system that is configured to track and record a current status of a job being executed. The current status can be obtained, for example, based on data from one or both of system management facilities (SMF) records and job entry system (JES) records.

The tracker system is also configured to report completion of the job to the controller. The recording includes storing two copies of the current status, where a first copy is stored in a shared memory location accessible by the controller, such as a CF. In accordance with one or more embodiments of the present invention, the second copy of the current status is stored in an extended common service area (ECSA) queue that is not accessible by the controller.

At block 504, it is determined, based at least in part on the monitoring, whether the tracker is operational. This can be determined, for example, based on whether the controller can communicate with the tracker system. In response to determining at block 504 that the tracker is operational, processing continues at block 506 with the controller waiting to receive a job completion message for the job from the tracker. In response to receiving the job completion message, or indication, the controller takes a job completion action at block 512. In accordance with one or more embodiments of the prevent invention, the job completion message is a record in an event dataset. The job completion action is based on how the job completed (e.g., in error, canceled, without error) and can include, for example, initiating execution of one or more additional jobs that depend on the job being completed or restarting the job in the event that it ended in error or was canceled.

In response to determining, at block 504, that the tracker is not operational, processing continues at block 508 with obtaining the current status of the job from the shared memory location. At block 510 it is determined whether the current status of the job indicates that the job is complete. If the job is not complete, processing continues at block 508 with obtaining the current status of the job. Once the job has completed, as determined at block 510, processing continues at block 512. In accordance with one or more embodiments of the present invention, current status records corresponding to the job are removed from the shared memory location upon completion of the job.

The process flow diagram of FIG. 5 is not intended to indicate that the operations are to be executed in any particular order, or that all of the operations shown in FIG. 5 are to be included in every case. Additionally, the processing shown in FIG. 5 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
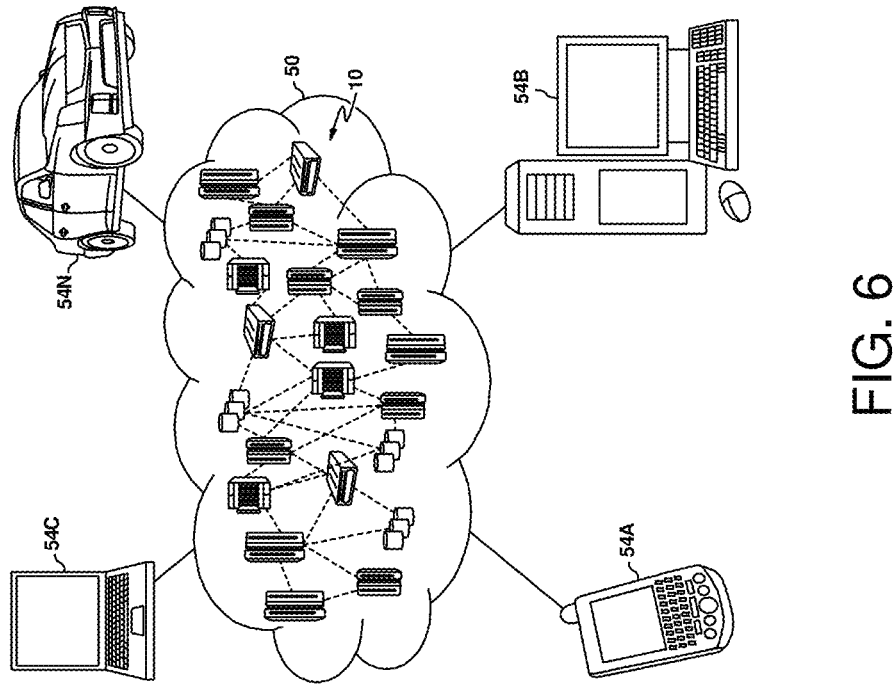
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
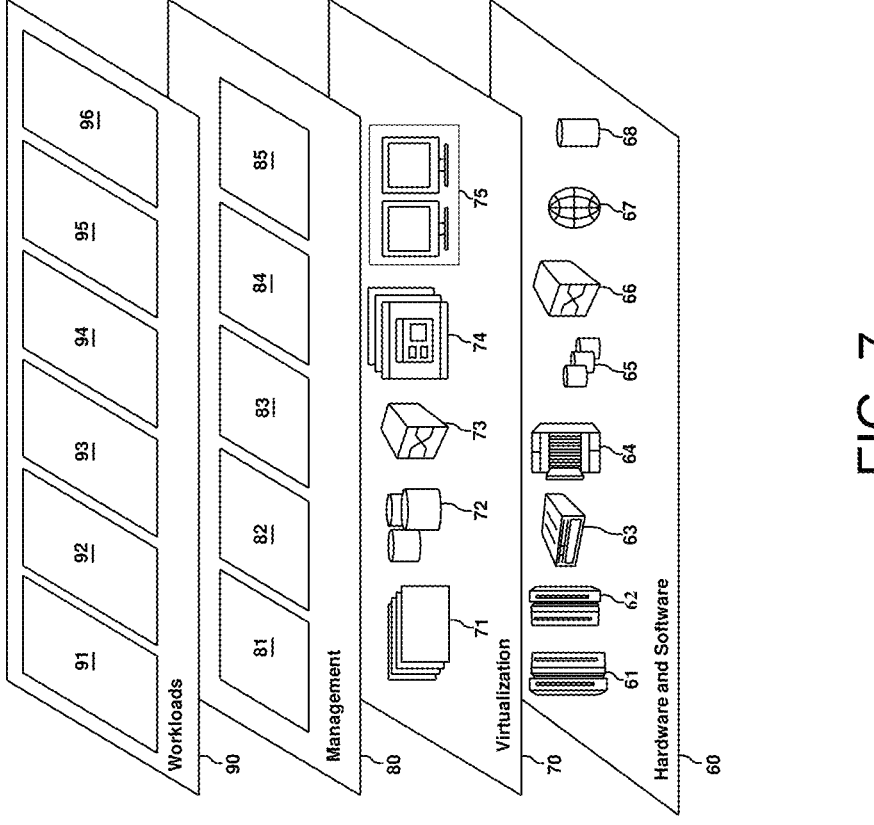
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 8:
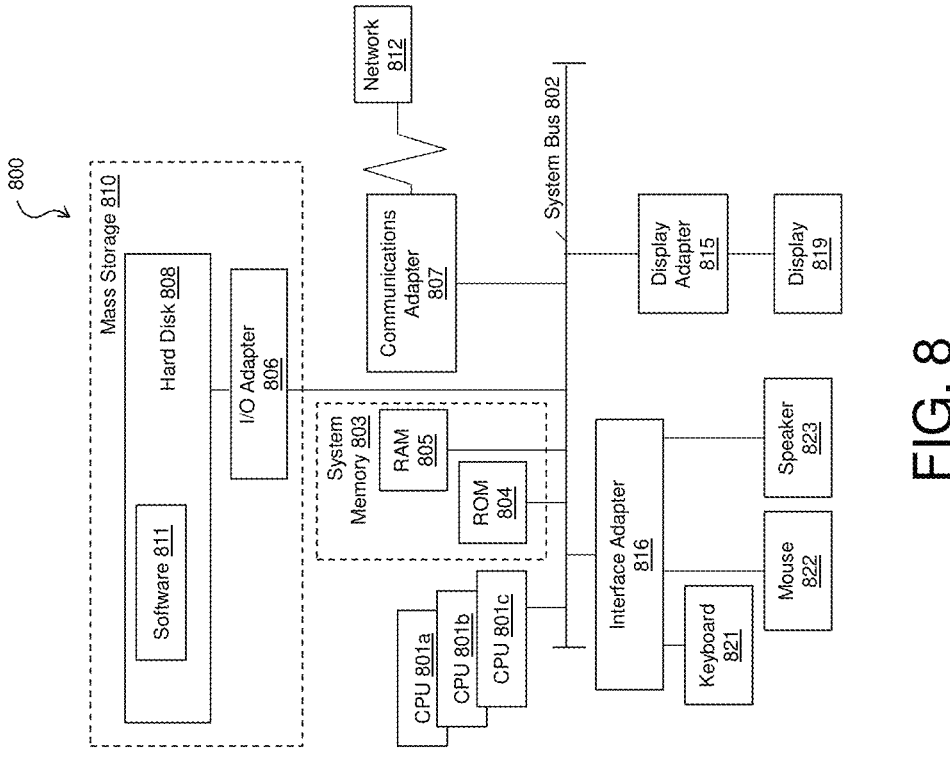
FIG. 8 illustrates a system for providing high availability scheduler event tracking according to one or more embodiments of the present invention.

Turning now to FIG. 8, a computer system 800 is generally shown in accordance with an embodiment. All or a portion of the computer system 800 shown in FIG. 8 can be implemented by one or more cloud computing nodes 10 and/or computing devices 54A-N of FIG. 6. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a. 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a serial advanced technology attachment (SATA) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS® or AIX® operating system, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
monitoring, by a controller, an operational status of a job tracking module that is configured to track and record a current status of a job being executed and to report completion of the job to the controller, the recording comprising storing two copies of the current status, a first copy stored in a coupling facility (CF) list structure that is globally addressable by a plurality of logical partitions (LPARs) of a sysplex and accessible by the controller, and a second copy stored in an extendable common service area (ECSA) queue resident in a same LPAR of the plurality of LPARs as the job tracking module and not directly accessible by the controller;
in response to determining, based on the monitoring, that the job tracking module is operational, waiting to receive a job completion message for the job from the job tracking module and performing a job completion action based on receiving the job completion message, wherein the job completion action is selected from a plurality of job completion actions based on how the job completed, wherein how the job completed is one of in error, canceled, or without error;
in response to determining, based on the monitoring, that the job tracking module is not operational:
obtaining the current status of the job from the CF list structure; and
performing the job completion action based on the current status indicating that the job has completed, wherein performing the job completion action enables the controller to continue execution of other jobs or actions that depend on the job being executed, thereby alleviating processing delays and improving response times responsive to the job tracking module not being operational; and
in response to determining that the job tracking module becomes available after not being operational for a period of time, resynchronizing events between the ECSA queue, the CF list structure, and an event dataset.

2. The method of claim 1, wherein current status records corresponding to the job are removed from the CF list structure upon completion of the job.

3. The method of claim 1, wherein it is determined that the job tracking module is not operational in response to the controller not being able to communicate with the job tracking module.

4. The method of claim 1, wherein the job completion action comprises initiating execution of a second job.

5. The method of claim 1, wherein the current status of the job is obtained from one or both of a system management facility (SMF) record and a job entry system (JES) record.

6. A system comprising:
one or more processors for executing computer-readable instructions, the computer-readable instructions controlling the one or more processors to perform operations comprising:
monitoring, by a controller, an operational status of a job tracking module that is configured to track and record a current status of a job being executed and to report completion of the job to the controller, the recording comprising storing two copies of the current status, a first copy stored in a coupling facility (CF) list structure that is globally addressable by a plurality of logical partitions (LPARs) of a sysplex and accessible by the controller, and a second copy stored in an extendable common service area (ECSA) queue resident in a same LPAR of the plurality of LPARs as the job tracking module and not directly accessible by the controller;

in response to determining, based on the monitoring, that the job tracking module is operational, waiting to receive a job completion message for the job from the job tracking module and performing a job completion action based on receiving the job completion message, wherein the job completion action is selected from a plurality of job completion actions based on how the job completed, wherein how the job completed is one of in error, canceled, or without error;

in response to determining, based on the monitoring, that the job tracking module is not operational:

obtaining the current status of the job from the CF list structure; and performing the job completion action based on the current status indicating that the job has completed, wherein performing the job completion action enables the controller to continue execution of other jobs or actions that depend on the job being executed, thereby alleviating processing delays and improving response times responsive to the job tracking module not being operational; and in response to determining that the job tracking module becomes available after not being operational for a period of time, resynchronizing events between the ECSA queue, the CF list structure, and an event dataset.

7. The system of claim 6, wherein current status records corresponding to the job are removed from the CF list structure upon completion of the job.

8. The system of claim 6, wherein it is determined that the job tracking module is not operational in response to the controller not being able to communicate with the job tracking module.

9. The system of claim 6, wherein the job completion action comprises initiating execution of a second job.

10. The system of claim 6, wherein the current status of the job is obtained from one or both of a system management facility (SMF) record and a job entry system (JES) record.

11. A computer program product comprising a computer-readable storage medium having program instructions embodied therewith, the program instructions executable by one or more processors to cause the one or more processors to perform operations comprising:

monitoring, by a controller, an operational status of a job tracking module that is configured to track and record a current status of a job being executed and to report completion of the job to the controller, the recording comprising storing two copies of the current status, a first copy stored in a coupling facility (CF) list structure that is globally addressable by a plurality of logical partitions (LPARs) of a sysplex and accessible by the controller, and a second copy stored in an extendable common service area (ECSA) queue resident in a same LPAR of the plurality of LPARs as the job tracking module and not directly accessible by the controller;

in response to determining, based on the monitoring, that the job tracking module is operational, waiting to receive a job completion message for the job from the job tracking module and performing a job completion action based on receiving the job completion message, wherein the job completion action is selected from a plurality of job completion actions based on how the job completed, wherein how the job completed is one of in error, canceled, or without error;

in response to determining, based on the monitoring, that the job tracking module is not operational:

obtaining the current status of the job from the CF list structure; and performing the job completion action based on the current status indicating that the job has completed, wherein performing the job completion action enables the controller to continue execution of other jobs or actions that depend on the job being executed, thereby alleviating processing delays and improving response times responsive to the job tracking module not being operational; and in response to determining that the job tracking module becomes available after not being operational for a period of time, resynchronizing events between the ECSA queue, the CF list structure, and an event dataset.

12. The computer program product of claim 11, wherein current status records corresponding to the job are removed from the CF list structure upon completion of the job.

13. The computer program product of claim 11, wherein it is determined that the job tracking module is not operational in response to the controller not being able to communicate with the job tracking module.

14. The computer program product of claim 11, wherein the job completion action comprises initiating execution of a second job.

* * * * *